(12) United States Patent
Averbuch et al.

(10) Patent No.: US 10,509,695 B1
(45) Date of Patent: Dec. 17, 2019

(54) SYSTEM AND METHOD FOR ANOMALY DETECTION IN DYNAMICALLY EVOLVING DATA USING LOW RANK MATRIX DECOMPOSITION

(71) Applicant: ThetaRay Ltd, Hod HaSharon (IL)

(72) Inventors: Amir Averbuch, Tel-Aviv (IL); Gil Shabat, Hod Hasharon (IL); Yaniv Shmueli, Kiryat Ono (IL)

(73) Assignee: ThetaRay Ltd., Hod Hasharon (IL)

( * ) Notice: Subject to any disclaimer, the term of this patent is extended or adjusted under 35 U.S.C. 154(b) by 260 days.

(21) Appl. No.: 15/085,006

(22) Filed: Mar. 30, 2016

Related U.S. Application Data

(60) Provisional application No. 62/139,813, filed on Mar. 30, 2015.

(51) Int. Cl.
*G06F 7/02* (2006.01)
*G06F 11/07* (2006.01)

(52) U.S. Cl.
CPC ........ *G06F 11/079* (2013.01); *G06F 11/0706* (2013.01); *G06F 11/0751* (2013.01); *G06F 11/0787* (2013.01)

(58) Field of Classification Search
CPC ... A61B 5/00; G06F 11/0706; G06F 11/0751; G06F 11/0787; G06F 11/079; G06F 17/30; G06F 17/30501; G06F 17/30598; G06F 21/56; G06K 9/00; G06N 99/00; H04L 29/06

See application file for complete search history.

(56) References Cited

U.S. PATENT DOCUMENTS

| | | | | |
|---|---|---|---|---|
| 5,892,900 | A * | 4/1999 | Ginter | G06F 21/10 726/26 |
| 7,739,082 | B2 * | 6/2010 | Scherrer | H04L 63/1425 703/2 |
| 8,090,592 | B1 * | 1/2012 | Goodall | G06Q 10/0635 705/2 |
| 9,032,521 | B2 * | 5/2015 | Amini | H04L 63/1433 726/22 |
| 9,591,020 | B1 * | 3/2017 | Aziz | G06F 9/45537 |
| 2012/0166142 | A1 * | 6/2012 | Maeda | G05B 23/0227 702/185 |
| 2014/0074796 | A1 * | 3/2014 | Akoglu | H04L 63/1425 707/687 |
| 2015/0331913 | A1 * | 11/2015 | Borowiec | H03M 7/3079 707/693 |
| 2016/0180022 | A1 * | 6/2016 | Paixao | G06F 19/322 705/3 |

OTHER PUBLICATIONS

G. Shabat et al. "Randomized LU decomposition", arXiv:130.7207 v4, 2016,p. 1-39.*

(Continued)

*Primary Examiner* — Albert Decady
*Assistant Examiner* — Enamul M Kabir
(74) *Attorney, Agent, or Firm* — Nathan & Associates; Manachem Nathan

(57) ABSTRACT

Detection of abnormalities in HDBD is performed by processing it to obtain a dictionary from a training data. This is done by computing a low rank randomized LU decomposition which enables constant online updating of the training data and thus gets constant updating of the normal profile in the background.

20 Claims, 7 Drawing Sheets

(56) References Cited

OTHER PUBLICATIONS

G. Shabat, Y. Shmueli, Y. Aizenbud and A. Averbuch, "Randomized LU decomposition", arXiv:130.7202 v4, 2016.
W. B. Johnson and J. Lindenstrauss, "Extensions of Lipshitz mapping into Hilbert space", vol. 26 of Contemporary Mathematics, pp. 189-206, Amer. Math. Soc., 1984.

* cited by examiner

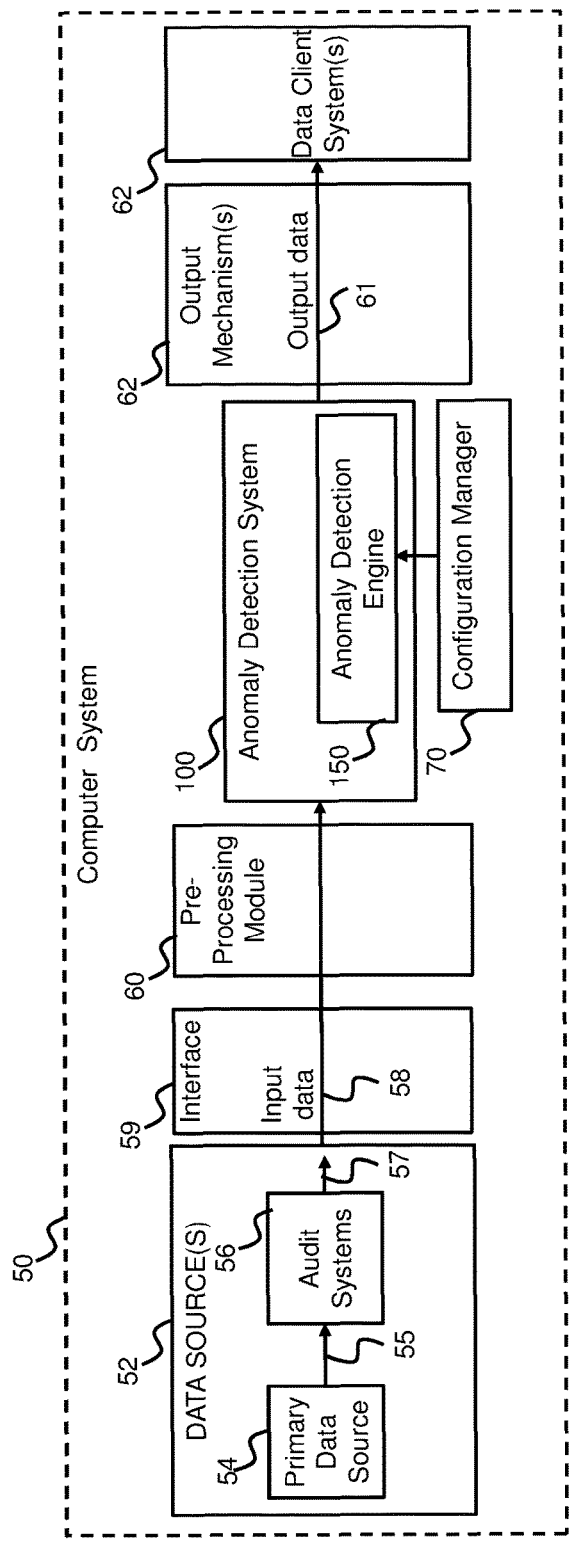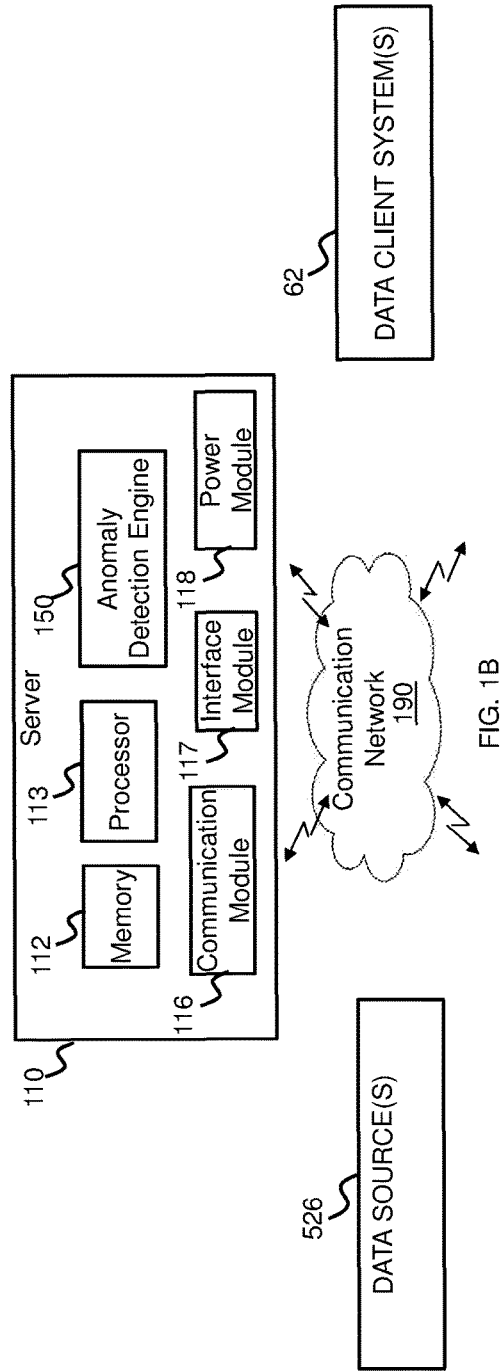

SYSTEM AND METHOD FOR ANOMALY DETECTION IN DYNAMICALLY EVOLVING DATA USING LOW RANK MATRIX DECOMPOSITION

CROSS REFERENCE TO RELATED APPLICATIONS

This application claims the benefit of U.S. Provisional patent application 62/139,813 filed Mar. 30, 2015 which is incorporated herein by reference in its entirety.

FIELD

Embodiments disclosed herein relate in general to methods and systems for detecting of unknown multidimensional data points (MDDPs) that are classified as anomalies (abnormalities) that deviate from normal behavior in high dimensional big data (HDBD) and which are indicative of an undesirable event.

BACKGROUND

Huge amounts of data are generated by many sources. "Data" refers to a collection of organized information, the result of experience, observation, measurement, streaming, computed, sensed or experiment, other information within a computer system, or a set of premises that may consist of numbers, characters, images, or as measurements of observations.

Static and dynamic "high dimensional big data" (HDBD) is common in a variety of fields. Exemplarily, such fields include finance, energy, transportation, communication networking (i.e. protocols such as TCP/IP, UDP, HTTP, HTTPS, ICMP, SMTP, DNS, FTPS, SCADA, wireless and Wi-Fi) and streaming, process control and predictive analytics, social networking, imaging, e-mails, governmental databases, industrial data, healthcare and aviation. HDBD is a collection of MDDPs. A MDDP, also referred to as "sample", "sampled data", "point", "vector of observations" or "vector of measurements", is one unit of data from the original (source, raw) HDBD. A MDDP may be expressed by Boolean, integer, floating, binary or real characters. HDBD datasets (or databases) include MDDPs that may be either static or may accumulate constantly (dynamic). MDDPs may include (or may be described by) hundreds or thousands of parameters (or "features").

The terms "parameter" or "feature" refer to an individual measurable property of phenomena being observed. A feature may also be "computed", i.e. be an aggregation of different features to derive an average, a median, a standard deviation, etc. "Feature" is also normally used to denote a piece of information relevant for solving a computational task related to a certain application. More specifically, "features" may refer to specific structures ranging from simple structures to more complex structures such as objects. The feature concept is very general and the choice of features in a particular application may be highly dependent on the specific problem at hand. Features can be described in numerical (3.14), Boolean (yes, no), ordinal (never, sometimes, always), or categorical (A, B, O) manner.

HDBD, with all its measured or streamed features and available sources of information (e.g. databases), may be classified as heterogeneous HDBD or simply as "heterogeneous data". The terms "heterogeneous" means that the data includes MDDPs assembled from numbers and characters having different meanings, different scales and possibly different origins or sources. Heterogeneous data may change constantly with time, in which case it is referred to as "heterogeneous dynamic" data.

In known art, HDBD is incomprehensible to understand, to draw conclusions from, or to find in it anomalies that deviate from a "normal" behavior. In this description, the terms "anomaly", "abnormality", "malfunction", "operational malfunction", "outlier", "deviation", "peculiarity" and "intrusion" may be used interchangeably. "Anomaly detection" refers to a process that identifies in a given dataset patterns that do not conform to established or expected normal behavior. The detected anomaly patterns often translate into critical and actionable information in many different application domains, such as cyber protection, operational malfunctions, performance monitoring, financial transactions, industrial data, healthcare, aviation, monitoring or process control. It is therefore clear that anomaly detection has huge practical commercial, security and safety implications, to name a few.

Known machine-learning-based anomaly detection methods include usually two sequential steps: training and detection. The training step identifies the normal behavior in training data, defines a distance (affinity or metric) and provides some normal characteristic (profile) of the training data. "Training data" is data of a finite size, used as a source for learning the behavior and the properties of the data. The affinity may be used to compute deviation of a newly arrived MDDP ("NAMDDP") from the normal data profile. The detection step computes the affinities for the NAMDDP and classifies the NAMDDP as either normal or abnormal.

Anomaly detection in HDBD is critical and in extensive use in a wide variety of areas. For example, anomaly detection is used to identify malicious activities and operational malfunction in network intrusions or financial fraud, customer behavioral change and manufacturing flaws in energy facilities. In financial activities, anomaly detection is used to detect fraud, money laundering and risk management in financial transactions, and to identify abnormal user activities. Anomaly detection in these areas may also be used to detect suspicious terrorist activities.

Another area is customer behavioral analysis and measurement, practiced for example in marketing, social media and e-commerce. In these areas, attempts are made to predict behavior intention based on past customer attitude and social norms. These predictions, in turn, will drive eventually targeted advertisements and online sales. Anomaly detection in this field would relate to monitoring of changes in consumers behavior, which may avoid substantial market losses.

Yet another area involves critical infrastructure systems or process control. In this area, many sensors collect or sense continuously several measurements in a predetermined time unit. When these sensors are connected through a communication network, the area is related to "Industrial Internet" and "Internet of Things". Fusion of these measurements leads to the construction of a HDBD dataset. Here, anomaly detection may be used exemplarily for fault detection in critical infrastructure or for inspection and monitoring, and enables to perform predictive analytics. While monitoring critical infrastructure resources, anomalies originated from cyber threats, operational malfunction or both can be detected simultaneously.

In an illustrative example of anomaly detection use, an entity such as a network, device, appliance, service, system, subsystem, apparatus, equipment, resource, behavioral profile, inspection machine, performance or the like is monitored. Assume further that major activities in incoming streamed HDBD obtained through the monitoring are recorded, i.e. a long series of numbers and/or characters are recorded and associated with time stamps respective of a time of recordation. The numbers or characters represent different features that characterize activities in or of the entity. Often, such HDBD has to be analyzed to find specific trends (abnormalities) that deviate from "normal" behavior. An intrusion detection system ("IDS") also referred to as anomaly detection system or "ADS", is a typical example of a system that performs such analysis. Malfunction is another typical example of an abnormality in a system.

Similar problems in identifying abnormalities in data are encountered in many network unrelated applications. One example relates to the control or monitoring of a process that requires detection of any unusual occurrences in real-time. Another example is the real-time (online) detection of operational malfunctions in SCADA protocols. Analysis of SCADA protocols can discover either malware insertion or operational malfunction or both.

Many of the current methods used to extract useful intelligence from HDBD require extensive computational resources, are time consuming, and, when used for anomaly detection, fail to detect anomalies before they become operational. Therefore, there is a need for, and it would be advantageous to have anomaly detection methods and systems that require less computational effort and are faster. There is also a need for anomaly detection methods and systems that can detect unknown anomalies representing unknown attacks or malfunctions. In other words, there is a need for methods and systems that perform automatic or "un-supervised" anomaly detection, defined as detection that does not require rules, signatures, patterns, domain expertise or semantics understanding of the input data. In addition, the number of false alarms should be as low as possible.

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

SUMMARY

In this description, an "undesirable event" indicated by an anomaly or by an "abnormal MDDP" may for example be any of (but not limited to): a cyber-threat, a cyber-attack, an operational malfunction, an operational breakdown, a process malfunction, a process breakdown, a financial risk event, a financial threat event, a financial fraud event or a financial network intrusion event.

In exemplary embodiments, there is/are provided a method or methods for detection of anomalies in HDBD indicative of undesirable events that are unknown before the application of the method or methods (referred to as "unknown" undesirable events) and systems for implementing such methods.

Embodiments disclosed herein provide a framework (methods and system) for finding anomalies captured by sensing/measuring/assembled logs or from streamed data. The raw data for example can also be aggregated and more computational features can be added. These features are derived by various computations on the raw data. Therefore, the input data can be either raw data or aggregrated data or data that was enriched by adding computational features or combination of any of the above.

The anomaly detection system may include an anomaly detection engine which is configured and operative to implement the processes, procedures, methods and/or operations for detecting an anomaly. The anomaly detection engine may comprise a plurality of software and/or hardware-based modules, as outlined herein below in more detail. For instance, a memory of an anomaly detection system may include instructions which, when executed e.g. by a processor and/or controller, may cause the execution of an anomaly detection method, process and/or operation. Merely to simplify the discussion that follows, methods and processes disclosed herein may herein be discussed in conjunction with an anomaly detection engine. One or more hardware, software and/or hybrid hardware/software modules may realize such an anomaly detection engine.

For example, the term "engine" may comprise one or more computer modules, wherein a module may be a self-contained hardware and/or software component that interfaces with a larger system. A module may comprise machine executable instructions. A module may be embodied by a processing circuit or a controller programmed to cause the system to implement the method, process and/or operation as disclosed herein. For example, a module may be implemented as a hardware circuit comprising, e.g., custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

In an exemplary embodiment, there is disclosed as method for detecting an undesirable event, comprising the steps of receiving a dataset comprising a plurality m of MDDPs.

Further a method described herein is based on (e.g., employs) randomized LU decomposition applied to a plurality m of received MDDPs described in G. Shabat, Y. Shmueli, Y. Aizenbud and A. Averbuch, "Randomized LU decomposition", arXiv:130.7202 v4, 2016. The term "LU decomposition" means lower and upper factorization of a matrix as the product of a lower triangular matrix and an upper triangular matrix. The randomized LU decomposition is applied to a m×n matrix A of data, where each row in A contains n extracted parameters (features) that are sampled (recorded, measured, streamed) in every predetermined time interval, a number k as an input, and returns the following four matrices: orthogonal permutation matrices P and Q of size m×m and n×n, respectively, a lower triangular matrix L of size m×k and an upper triangular matrix U of size k×n. Ideally, k<<n. k is the intrinisic dimension (rank) of the matrix A. k can be computed automatically or given. If computed, k is computed once. Each row in A contains n parameters (one MDDP) extracted in each time unit.

The product LU forms a low rank approximation to PAQ. More specifically:

$$\|PAQ-LU\|_2 \leq O(\sigma_{k+1}), \qquad (1)$$

where $\sigma_{k+1}$ is the (k+1)th singular value of A. Moreover, the error of projecting and reconstructing the original data A on the matrix $D:=P^T L$ is bounded. More specifically $$\|DD^\dagger A - A\| \leq O(\sigma_{k+1}), \qquad (2)$$

where $D^\dagger$ is the pseudo inverse of D. We refer to the matrix D as a "dictionary". The dictionary D classifies whether the MDDP is normal or abnormal. The constructed dictionary D enables classification to be executed automatically and/or unsupervised without relying, e.g., on signatures, rules and/ or domain expertise. The particular MDDP classified as abnormal is indicative of an unknown undesirable event. A Randomized LU decomposition module may be part or employed by an anomaly detection engine.

In an exemplary embodiment, a system for detecting an unknown undesirable event disclosed herein comprises an input device configured to receive a dataset comprising a plurality m of MDDPs, a processor configured to execute instructions stored in a memory to apply the randomized LU decomposition to the plurality of MDDPs to produce 4 matrices, and a dictionary construction module, denoted hereinafter as "DC" module, for constructing a dictionary from the matrices obtained by the application of the randomized LU module. [The dictionary construction module may be part of the anomaly detection engine. Using the output of the dictionary construction module, a results module is operative and configured to classify a particular MDDP of the dataset or a newly arrived MDDP (NAMDDP), which is not part of the dataset as an abnormal MDDP, wherein the classification is automatic and unsupervised without relying on a signature, rules or domain expertise and wherein the particular MDDP classified as abnormal is indicative of the unknown undesirable event.

Exemplarily, the HDBD may be processed using a matrix A representing MDDP as a training dataset of size m×n, where m is the number of data points (rows of the matrix) and n denotes the dimensions respective of the data point features of the training data. Exemplarily, n≥2. The training data can contain anomalies.

Features may include:

1. In communication networking data: features from TCP protocol:
Number of TCP/IP packets; number of UDP/IP packets; number of ICMP packets; number of packets which are not TCP, UDP or ICMP; number of TCP packets with TCP flag "syn" ON; number of TCP packets with TCP flag "ack" ON; number of TCP packets with TCP flag "cwr" ON; number of TCP packets with TCP flag "ecn" ON; number of TCP packets with TCP flag "fin" ON; number of TCP packets with TCP flag "ns" ON; number of TCP packets with TCP flag "push" ON; number of TCP packets with TCP flag "res" ON; number of TCP packets with TCP flag "reset" ON; number of TCP packets with TCP flag "urg" ON; number of TCP packets with destination port 80 (HTTP); number of UDP packets with destination port 53 (DNS); number of TCP packets with source port 0; number of data TCP packets which where retransmitted (indication of slow application performance and packet loss); number of control TCP packets (packets without a payload); number of data TCP packets (packets with a payload); number of data TCP bytes (the bytes count of all the payloads); number of TCP connections (sessions); number of completed TCP connections; ratio between the number of TCP packets with reset flag ON and the number of TCP packets with syn flag ON (computed feature); ratio between the number of TCP packets with syn-ack flags and/or the number of TCP packets with syn flag (computed feature).

2. In process control data: features from a laser machine: Base Plate Temp; BBO temp; Current Crystal; Error Signal Gain; Error Signal Max; Error Signal Min; Error Signal Offset; Etalon Temp; Laser Diode Drv. Curr.; Hor. Pos. 2nd Quadr. Ph.-D.; LBO Temp; PD1; PD2; Power Alarm Threshold; and/or Power From Diode1.

3. In financial data: transaction logs; account balance snapshots; customer profiles; applicant information such as income, age, account balance; collateral information such as postal code, property value, property type; application information such as loan type and/or interest, conditions. In general, each feature can be a measurement (e.g. balance, amount etc.), an identifier (e.g. account number, user id etc.) or a code (status/error code etc.). Fraudulent features may include: scheme, journal entry, journal description, manual insertion, posted date, effective date, period, debit, credit, row ID, account and/or account description.

In some embodiments, the method may include, for example, applying randomized LU ("LU" standing for "lower and upper triangular matrix") decomposition ("Function 2", see below) to a training data of m MDDPs to obtain 4 matrices. The application of randomized LU decomposition may exemplarily include applying random projection of the training matrix A followed by the application of LU decomposition ("Function 1", see below). The output from the application of Function 2 is used by a Function 3, see below, to produce the dictionary D. The dictionary is used by a Function 4, see below, to classify if the MDDP is normal or abnormal.

An exemplary LU decomposition method (i.e. obtaining lower and upper triangular matrix decomposition) is outlined in G. H. Golub, C. F. Van Loan, "Matrix Computations", $4^{th}$ Edition, John Hopkins, 2012 (Page 130). This method is referred to henceforth as "LU decomposition" or "Function 1".

Function 1: LU Decomposition with Partial Pivoting

A LU decomposition module computes the factorization PA=LU where P is a permutation matrix encoded by piv(1: n−1), L is unit lower triangular with $|l_{ij}|\leq 1$, and U is upper triangular. For i=1, . . . , n, A(i,i:n) is overwritten by U(i,i:n) and A(i+1:n,i) is overwritten by L(i+1:n,i). The permutation P is given by $P=\Pi_{n-1} \ldots \Pi_1$ where $\Pi_k$ is an interchange permutation obtained by swapping rows k and piv(k) of $I_n$.

Input:
Matrix A of size m×n to decompose;
Output:
Matrices P, L, U such that PA=LU where L and U are the lower and the upper triangular matrices, respectively, and P is an orthogonal permutation matrix given by $P=\Pi_{n-1} \ldots \Pi_1$ where $\Pi_k$ is an interchange permutation obtained by swapping rows k and piv(k) of $I_n$ An example pseudo-code implementation of LU decomposition (Function 1) is disclosed herein below:
1) Initialize L to identity and U to a zero matrix
2) for j=1 to n
  a. if j=1
    i. v=A(:,1)
  b. else
    i. $\tilde{a}=\Pi_{j-1} \ldots \Pi_1 A(:,j)$
    ii. Solve $L(1:j-1,1:j-1)z=\tilde{a}(1:j-1)$ for $z \in R^{j-1}$
    iii. U(1:j−1,j)=z, v(j:n)=ã(j:n)−L(j:n, 1:j−1)z
  c. end
  d. Determine μ with j≤μ≤n so $|v(\mu)|=\|v(j:n)\|_\infty$ and set piv(j)=μ
  e. v(j)↔v(μ), L(j,1:j−1)↔L(μ,1:j−1), U(j,j)=v(j)
  f. if v(j)≠0
    i. L(j+1:n,j)=v(j+1:n)/v(j)
  g. end
3) end The randomized LU module (Function 2) applies random projections described exemplarily in W. B. Johnson and J. Lindenstrauss, "Extensions of Lipshitz mapping into Hilbert space", Volume 26 of Contemporary Mathematics, pp. 189-206, Amer. Math. Soc., 1984.

The output from the application of the randomized LU module (Function 2) is then used by the DC module to produce the dictionary D. The dictionary is used by a classifier module (Function 4) to classify if the MDDP is normal or abnormal.

An anomaly detection method and associated system disclosed herein may be characterized by not having or using domain expertise, signatures, rules, patterns or semantics understanding of all the available features. Throughout the rest of this disclosure, "online" is used among other things to mean a process that can efficiently process the arrival of new samples, e.g., substantially in real-time. To achieve online anomaly detection, some systems may use signatures and rules of intrusions, which are developed and assembled manually after a new anomaly is exposed and distributed. This approach may be problematic, because these systems detect only already-known intrusions ("yesterday's" attacks and anomalous malfunctions) but fail to detect new attacks ("zero-day" attacks). In addition, they do not cover a wide range of high quality, new, sophisticated emerging attacks that exploit many network vulnerabilities.

In both offline and online processing, anomalies are detected first in a training dataset having training data. In offline processing, newly arrived MDDPs can be added to the training data and the anomaly detection process is applied from start to the new enhanced training data (which includes now the added newly arrived MDDPs). In online processing, embodiments disclosed herein have access only to the training data. The rest of the data (commonly referred to as "testing data") is sensed/streamed/captured constantly in real-time, and classification of each newly arrived MDDP (NAMDDP) as being either normal or abnormal is done online. In offline processing, it is assumed that the training data and the testing data are the same.

Exemplary method embodiments disclosed herein do not use domain expertise, signatures, rules, patterns or semantics understanding of all the available features. Accordingly, an exemplary method disclosed herein detects the anomalous MDDP but does not provide the root cause of the occurrence of the anomaly, i.e. does not identify the cause of the undesirable event. In other words, the source of such an anomalous MDDP (the undesirable event) cannot be classified during the detection stage. It is the MDDP itself, rather than the source thereof, which is classified as an anomalous MDDP. The classification is performed without relying on a signature of a threat.

In an embodiment there is provided a computer program product for performing anomaly detection, a detected anomaly being indicative of an undesirable event, the computer program product comprising: a non-transitory tangible storage medium readable by a processing circuit and storing instructions for execution by the processing circuit for performing a method comprising receiving data comprising a plurality m of multidimensional datapoints (MDDPs), each data point having n features, constructing a dictionary D based on the received data, and classifying a NAMDDP as an anomaly or as normal based on the dictionary D and on a threshold T. In an embodiment, the method further comprises the step of applying randomized LU decomposition to a m×n matrix A of the data to obtain an output, wherein the step of constructing a dictionary D based on the received data includes constructing the dictionary D based on the obtained output. In an embodiment, the output includes orthogonal permutation matrices P and Q of size m×m and n×n, respectively, a lower triangular matrix L of size m×k and an upper triangular matrix U of size k×n and wherein k is the rank of matrix A. In an embodiment, the classifying is performed automatically and/or unsupervised without relying on a signature and/or a rule and/or on domain expertise. In an embodiment, the method further comprises determining a score S based on the constructed dictionary D. In an embodiment, the score S indicates if the received MDDPs are spanned in the constructed dictionary D or not. In an embodiment, the classifying comprises comparing the determined score S against threshold T. In an embodiment, the method may be performed offline or online. In an embodiment, the non-transitory tangible storage medium is cloud-based, hardware-server based and/or virtual-server based. In an embodiment, parameter settings used by the instructions are dynamically, automatically and on-the-fly configurable while the instructions are executed by the processing circuit. In an embodiment, the receiving data comprises running of integrity tests, detecting significant features, selecting the significant features and enhancing the significant features of the dataset for obtaining data for analysis. In an embodiment, the data is received from a plurality of data sources. In an embodiment, the data may be received at the non-transitory tangible storage medium via a plurality of interfaces.

In an embodiment there is provided a detection system for performing anomaly detection, a detected anomaly being indicative of an undesirable event, the system comprising: a computer and an anomaly detection engine executable by the computer, the anomaly detection engine configured to perform a method comprising receiving data comprising a plurality m of multidimensional datapoints (MDDPs), each data point having n features constructing a dictionary D based on the received data, and classifying a NAMDDP as an anomaly or as normal based on the dictionary D and on a threshold T. In an embodiment of the detection system, the anomaly detection engine is configured to perform a method further comprising the step of applying randomized LU decomposition to a m×n matrix A of the data to obtain an output, wherein the step of constructing a dictionary D based on the received data includes constructing the dictionary D based on the obtained output. In an embodiment of the detection system, the output includes orthogonal permutation matrices P and Q of size m×m and n×n, respectively, a lower triangular matrix L of size m×k and an upper triangular matrix U of size k×n and wherein k is the rank of matrix A.

In an embodiment there is provided a method for performing anomaly detection, a detected anomaly being indicative of an undesirable event, comprising: receiving data comprising a plurality m of MDDPs, constructing a dictionary D based on the received data, and classifying a NAMDDP as an anomaly or as normal based on the dictionary D and a on threshold T.

In an embodiment there is provided a computer program product directly loadable into the internal memory of a computer, comprising software code portions for performing a method described above when the product is run on the computer.

In an embodiment there is provided a non-transitory computer readable storage medium storing a set of instructions that are executable by at least one processor of a server to cause the server to perform a method for detecting an anomaly in received multidimensional datapoints the method comprising: receiving data comprising a plurality m of MDDPs, each data point having n features, constructing a dictionary D based on the received data, and classifying a NAMDDP as an anomaly or as normal based on the dictionary D and a threshold T. In an embodiment, the method further comprises the step of applying randomized LU decomposition to a m×n matrix A of the data to obtain an output, wherein the step of constructing a dictionary D based on the received data includes constructing the dictionary D based on the obtained output. In an embodiment, the output includes orthogonal permutation matrices P and Q of size m×m and n×n, respectively, a lower triangular matrix L of size m×k and an upper triangular matrix U of size k×n and wherein k is the rank of matrix A. In an embodiment, the randomized LU decomposition is parallelized.

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

BRIEF DESCRIPTION OF THE DRAWINGS

For simplicity and clarity of illustration, elements shown in drawings are not necessarily been drawn to scale. For example, the dimensions of some of the elements may be exaggerated relative to other elements for clarity of presentation. Furthermore, reference numerals may be repeated among the figures to indicate corresponding or analogous elements. The figures are listed below.

FIG. 1A shows a block diagram of a computer system operative to detect an anomaly in MDDP, according to an embodiment;

FIG. 1B shows another block diagram of the computer system of FIG. 1A;

DETAILED DESCRIPTION

Figure 2:
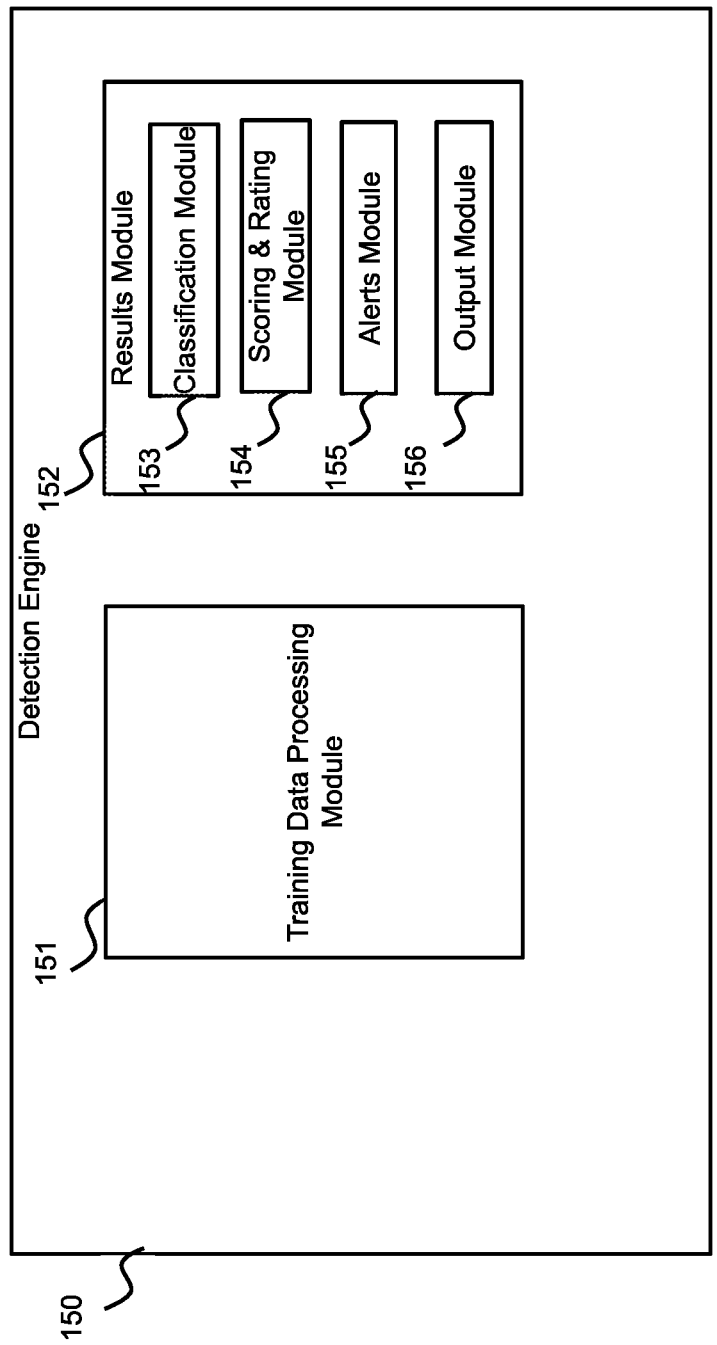
FIG. 2 shows a block diagram of a detection engine, according to an embodiment.

Referring to FIG. 1A, a computer system 50 may comprise an anomaly detection system 100 which may be operative to detect anomalies in computer system 50, according to embodiments disclosed herein.

Methods, processes and/or operations for detecting anomalies may be implemented by an anomaly detection engine 150 comprised in anomaly detection system 100. The term "engine" as used herein may also relate to and/or include a module and/or a computerized application.

Data input to anomaly detection engine 150 may be of a versatile structure and formats, and its volume and span (the number of parameters) can be theoretically un-limited.

Computer system 50 may include a variety of data sources 52 providing inputs (e.g., feature-based data) to anomaly detection engine 150. Non-limiting examples of data sources 52 may include networks, sensors, data warehouses and/or process control equipment, which may herein be referred to as "primary data sources" 54. Data provided by primary data sources 54 may comprise, for example, historian data, financial data, sensor data, network traffic data, production data and/or the like, which may herein be collectively referred to as "source data" 55. In some embodiments, source data 55 may be input to risk systems, audit system, security events managements systems and/or the like. These risk systems, audit systems, etc, may herein be collectively referred to as "audit systems" 56, providing audited data 57. Audit systems 56 may comprise platforms and/or services developed by commercial vendors collecting security events data.

Source data 55 and/or Audited data 57 may herein be collectively referred to as "input data" 58 which may be input to anomaly detection systems 100. In some embodiments, input data may not include audit data 57.

In an embodiment, input data 58 may be provided to detection engine 150 via one or more interfaces 59. An interface 59 may ingest input data by employing a variety of mechanisms including, for example, (push/pull), in real time and/or in batches (historical data), over a variety of protocols and technologies. Interface 59 may for example comprise an input storage system, e.g., Hadoop Distributed File System (denoted hereinafter HDFS), SPLUNK, which is a commercial platform to perform Operational Intelligence, FILE TRANSFER, Micros service, REpresentational State Transfer—architectural concept of live streaming (denoted hereinafter REST API), and more.

Input data may be filtered by anomaly detection system 100, which may provide as output data 61 to one or more data client systems 63. Output data 61 may comprise filtered input data to one or more data client systems 63.

In some embodiments, output data 61 may be descriptive of analysis results, e.g., descriptive of anomaly events. In some embodiments, the output data may comprise filtered input data, i.e., input data which is free or substantially free of anomalies.

Data client systems 63 may include, for example, a multifunction mobile communication device also known as "smartphone", a personal computer, a laptop computer, a tablet computer, a server (which may relate to one or more servers or storage systems and/or services associated with a business or corporate entity, including for example, a file hosting service, cloud storage service, online file storage provider, peer-to-peer file storage or hosting service and/or a cyberlocker), customer databases, personal digital assistant, a workstation, a wearable device, a handheld computer, a notebook computer, a vehicular device, a stationary device, a controller, and/or a home appliances control system.

Output data 61 may be provided to data client systems 63 using a variety of output mechanisms 62 including, for example, using a push/pull protocol, substantially in real time or periodically (e.g., in batches) over a variety of technologies and/or protocols. Non-limiting examples of technologies and/or protocols include Arcsite, which gathers and organizes graphic data, SPLUNK, FILE TRANSFER, HDFS, REST API, Comma Separated Variables (CSV) format, JSON, which is a platform for the development of multi-agent systems, and more.

In an embodiment, computer system 50 may comprise a configuration management module 70 which is operative to controllably and dynamically configure anomaly detection system 100, e.g., to optimize its results and/or provide judgmental qualitative and quantitative measures on its operation. Configuration management module 70 may allow configuring the operation and/or workflow of detection engine 150, as well as monitoring and control thereof. Configuration management module 70 may be operative to configure the operation and/or workflow of detection engine 150 automatically. Operation of configuration manager 70 may be invoked by anomaly detection engine 150, e.g., responsive to an event (e.g., an anomaly) detected by detection engine 150. While configuration management module 70 is schematically illustrated in FIG. 1A as external to anomaly detection system 100, this should by no means be construed limiting. In some embodiments, configuration management module 70 may be part of anomaly detection system 100.

Additionally referring to FIG. 1B, an anomaly detection system 100 may include or be implemented by a server 110 running anomaly detection engine 150. Server 110 may be in operable communication with data sources 52 and data client systems 63 over a communication network 190.

While anomaly detection system 100 and engine 150 are herein illustrated as being implemented by server 110, this should by no means be construed limiting. Accordingly, anomaly detection engine 150 may be implemented by any suitable device, fully or partially. For example, some implementations and/or portions and/or processes and/or elements and/or functions of navigation engine 150 may be implemented by interface 59 and/or data client systems 63. Hence, in some embodiments, interface 59 and/or data client systems 63 for example may be considered be part of anomaly detection system 100.

Server 110 may refer, for example, to one or more servers or storage systems and/or services associated with a business or corporate entity, including for example, a file hosting service, cloud storage service, a hardware server, a virtual server, an online file storage provider, peer-to-peer file storage or hosting service and/or a cyberlocker. Server 110, which hosting the invention, may appear in various deployments models: cloud based, hardware sever, or virtual.

Server 110 may include a database 111, a memory 112 and a processor 113. Moreover, server 110 may include a communication module 116, a user interface module 117 and a power module 118 for powering the various components of server 110.

Memory 112 may include one or more types of computer-readable storage media including, for example, transactional memory and/or long-term storage memory facilities and may function as file storage, document storage, program storage, and/or as a working memory. The latter may, for example, be in the form of a static random access memory (SRAM), dynamic random access memory (DRAM), read-only memory (ROM), cache or flash memory. As long-term memory, memory 112 may, for example, include a volatile or non-volatile computer storage medium, a hard disk drive, a solid state drive, a magnetic storage medium, a flash memory and/or other storage facility. A hardware memory facility may, for example, store a fixed information set (e.g., software code) including, but not limited to, a file, program, application, source code, object code, and the like. As working memory, memory 112 may, for example, process temporally-based instructions.

Communication module 116 may, for example, include I/O device drivers (not shown) and network interface drivers (not shown) for enabling the transmission and/or reception of data over a communication network 190. A device driver may, for example, interface with a keypad or a USB port. A network interface driver may, for example, execute protocols for the Internet, or an Intranet, Wide Area Network (WAN), Local Area Network (LAN) employing, e.g., Wireless Local Area Network (WLAN)), Metropolitan Area Network (MAN), Personal Area Network (PAN), extranet, 2G, 3G, 3.5G, 4G including for example Mobile WIMAX or Long Term Evolution (LTE) advanced, Bluetooth®, Zig-Bee™, near-field communication (NFC) and/or any other current or future communication network, standard, and/or system.

The term "processor", as used herein, may additionally or alternatively refer to a controller. Processor 113 may be implemented by various types of processor devices and/or processor architectures including, for example, embedded processors, communication processors, graphics processing unit (GPU)-accelerated computing, soft-core processors and/or embedded processors.

Memory 112 may include instructions which, when executed e.g. by processor 113, may cause the execution of a method for detecting anomaly. Merely to simplify the discussion that follows, methods and processes disclosed herein may herein be discussed in conjunction with anomaly detection engine 150. One or more hardware, software, and/or hybrid hardware/software modules may realize anomaly detection engine 150.

Anomaly Detection Engine 150 may be operative to classify input data into normality or abnormality and to store, e.g., in memory 112, the analyzed input data as well as the computed dictionaries Reverting to FIG. 1A, computer system 50 may include, in some embodiments, a pre-processing module 60. In an embodiment, pre-processing module 60 may receive input data, selecting the significant features, enhancing them as outlined in more detail herein below, and preparing the data for analysis.

Further referring to FIG. 2, the analysis may be performed by a training data processing module 151 and a results module 152 of detection engine 150.

In an embodiment, training data processing module 151 may execute core functions for detecting anomalies, including the application of randomized LU to build dictionaries, outlined herein below in more detail.

In an embodiment, result module 152 may comprise a classification module 153, a scoring and rating module 154, an alerts module 155 and an output module 156.

Classification module 153 may classify received input data as "normal" or "abnormal" ("anomaly"), as outlined herein in more detail Parameters rating module 154 may for example provide key investigation leads for pin-pointing to the root of the detected anomaly, for example, for later investigation, e.g., by employing slice & dice similarity analysis.

Alerts module 155 may prepare alerts, which may be reported via output module 156.

Anomaly detection system 100 and/or detection engine 150 being executed by detection system 100 may be dynamically configurable, manually or automatically, "on-the-fly". The term "configuring" as used herein as well as grammatical variations thereof may include, for example, adding, changing and/or the removing of data sources; modification of data types and/or formats; modification of interfaces; modification of operational modes; feature selection; feature enhancement by computation; data sorting, data integrity validation; addition, omission and/or modification of measures computed on input data; changing data input mechanisms which may include, for example, "pull and push" over a variety of collection technologies; performing batch mode, live streaming or both; applying and/or modifying computational measures to the input data features and/or further addition, omission and modification of the measure—all done on-the-fly without changing the system software code and without even halting the system's operation.

In an embodiment, the various configurations and modifications inputs may be provided by a user via user interface 117 which may include, for example, a keyboard and/or a touch screen. In an embodiment, the mechanism of pull/push may be applied to input and to output data in the same way or differently.

Pre-processing module 60 may receive a list of input sources via a variety of interfaces, using various protocols and mechanisms. Pre-processing module 60 may process input data (e.g. in the form of a matrix A that has for example m data points and n features defined below) for determining its integrity, selects features from the input data for analysis, and, optionally, enhance the selected features, e.g., with aggregations and other methods, to obtain enhanced feature vectors. These activities may be called "Operation Maintenance Administration Provisioning" (OMAP) or "computed features".

Data relating to the OMAP may be stored in memory 112 by pre-processing module 60. Such data may include, as already indicated herein, input data, processed input data, selected input data, and, optionally, data descriptive of enhanced feature vectors.

In some embodiments, the enhanced feature vectors may be input to training data processing module 151. In some embodiments, training data processing module 151 may be operative and configured to identify training data that will enable to detect anomalies in offline and/or online modes.

In online processing, detected anomalies are related to NAMDDPs. In some embodiments, detection engine 150 may perform domain analytics in a "data-driven" manner. In other words, operational flow and control of detection engine 150 may be "data-driven" such to achieve seamless integration of detection system 100 with any data source.

The data-driven manner of domain analytics makes system 100 applicable for data analytics in any (even futuristic, unknown, not yet defined, unpredictable) domain, such as industrial data, financial information, aviation, healthcare, telecom, transportation and/or predictive analytics.

Anomaly detection engine 150 may be configured and operative to allow data-driven instilling of input data, of any type, in any format, without any prior knowledge of its structure and logical meaning.

In an embodiment, data-driven input processing can include integrity checks, cleaning and filtering.

In an embodiment, data-driven enhancement of computational measures on input data features including algebraic operations, statistical operators (deviation), aggregations, linking with different external tables, joining between different tables/sources into a single source, filtering, join of data items, and/or sorting.

In some embodiments, anomaly detection system 100 may allow dynamic, self-balanced, data-driven work flow of anomaly detection. Such work flow may for example include reading run-time configuration data from, e.g., memory 112 and/or from database and generate executable elements according to the configuration data. For example, the run-time configuration data may determine the number of executable elements of pre-processing module 70, and of computational elements of training data processing module 151, respectively. Then, due to changes in the velocity or rate of ingested input data, system 100 may dynamically and on-the-fly change its operational parameters, to create more computational elements to handle and pre-process input data. This way, the work flow, throughput and performance are optimized.

MDDPs may be scored by results module 153 from strong to weak. The MDDP parameters of the anomalies are rated for finding the root cause for the anomalies occurrences. This enables to achieve comparatively more reliable forensic, as opposed to when using domain expertise, rules, signatures and semantics to analyze input data.

As indicated above, the anomaly detection system provided herein has two operational modes: offline and online.

The operational modes are of both system and method. The offline mode (also referred to as training process) may be applied to a fixed dataset known in advance. The online mode processes newly-arrived MDDPs (NAMDDPs) that did not participate in the training process. In some embodiments, a training process may be applied to a dataset that comprises "old" NAMDDPs. "Old NAMDDP" refers to an NAMDDP that was fused with an existing MDDP (e.g., training data) stored, e.g., in memory 112 of system 100. For example, such "old" NAMDDPs may be fused with NAMDDPs to obtain new training data. In some embodiments, a step that is performed in the offline mode may be executed in the online mode. However, merely to simplify the discussion that follows, without being to be construed as limiting, the terms "offline mode" and "online mode" are used herein for indicating the processing of a fixed dataset known in advance and for the processing of NAMDDPs, respectively. NAMDDPs are processed online based on the offline-processed dataset.

Accordingly, the offline and the online modes may be used to detect anomalies in fully known data and in NAMDDPs, respectively. The fully known data and NAMDDPs can come from different sources.

Figure 3:
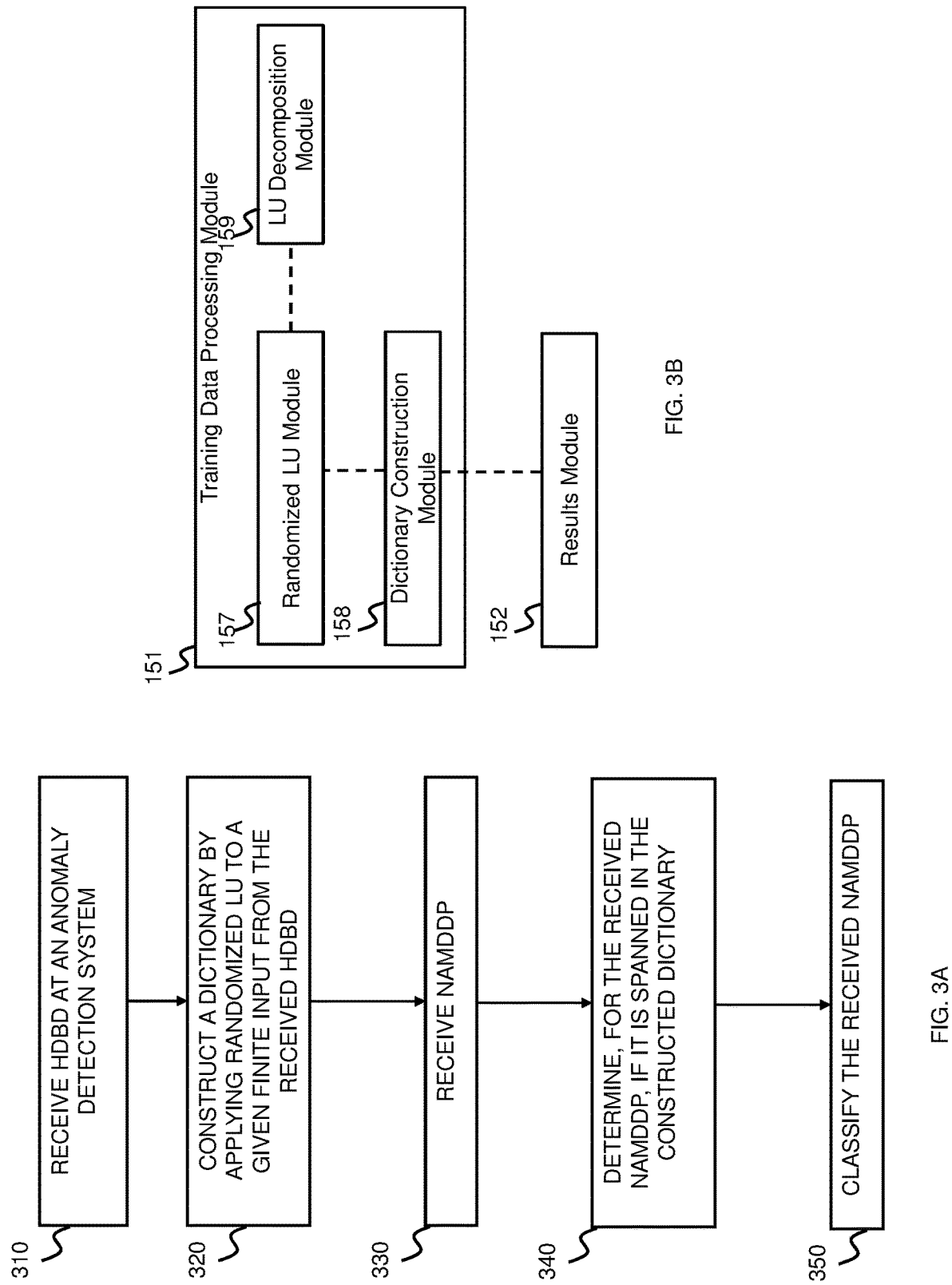
FIG. 3A shows a flow chart of a method for detecting anomaly in HDBD, according to an embodiment.
FIG. 3B shows a block diagram of a detection module of the detection engine, according to an embodiment.

Further reference is made to FIGS. 3A and 3B. In an embodiment, the method may include, in the online mode, receiving HDBD (step 310) at anomaly detection system 100. For example, HDBD may be received from data sources 52 as input at memory 112.

As already mentioned herein, input data may be received from a variety of data sources 52. Non-limiting examples of data sources include network traffic, logs, equipment sensors, production data and/or historian. In some embodiments, input data may be organized in a matrix A. Matrix A may be a "feature-based" matrix A. In some embodiments, organizing the received data may include removal of duplicate MDDPs entries in A.

In an embodiment, matrix A may can be viewed as a matrix of size m×n, where the rows m represent the number of measured of MDDPs, and columns n represent the different features (or parameters) for each measured MDDP. The rows of matrix A may also be referred to as "vector of m data points". The matrix A is also called the training set.

In an embodiment, the method may further include constructing a dictionary via the application of a randomized LU to a given finite input from the HDBD (step 320). Step 320 may referred to as a training sequence. The application of randomized LU may be performed by a Randomized LU module 157, in conjunction with a LU decomposition module 159 of training data processing module 151. A dictionary may be constructed by a dictionary constructions module 158 of training data processing module 151.

In an embodiment, the method may then include receiving NAMDDPs (step 330).

In an embodiment, the method may further include determining (step 340), for the received NAMDDP, if it is spanned in the constructed dictionary. Step 340 may only be applied on received NAMDDP which did not participate in step 320 for constructing the dictionary.

In an embodiment, the method may then include in step 350 determining, based on the result of step 340, classifying the received NAMDDP. For example, if the received NAMDDP is spanned in the constructed dictionary, the received NAMDDP is classified as a normal MDDP. Otherwise, the received NAMDDP is classified as an anomalous NAMDDP. In some embodiments, and as outlined further below in more detail, steps 340 and 350 may be performed by modules 157-159 shown in FIG. 3B. Classifying the received NAMDDP may be performed by results module 152.

In online mode, a NAMDDP x∈R$^n$ and x∉A, which does not belong to A, is classified as either normal (inlier) or anomalous (outlier) MDDP. In offline mode (x∈A), outliers in A are classified as anomalous MDDPs.

It is noted that the offline mode of operation, the training and the testing operate on the same data and the constructed dictionaries in the training data are applied to the same data. Therefore, the offline mode of operation is a special private case of the online mode of operation. Already-known MDDPs (x∈A) may be processed offline and referred to as training data.

In some embodiments, step 340 may further include, in addition to constructing the received dictionary D, receiving a threshold T. Threshold T may be predetermined, e.g., by an administrator of detection system 100 and/or updated dynamically, e.g., periodically and automatically.

Threshold T can be determined according to one or more threshold settings criteria. In an embodiment, T can be determined based on a certain percentage of NAMDDPs which have the largest score S. For instance, 10% or less; or 5% or less of the NAMDPPs with the largest score S may be selected. Optionally, NAMDDPs that have a score S greater above a certain limit (e.g., S>10$^{-4}$) may serve as a basis for determining threshold T. Optionally, the scores of the NAMDDPs that meet the one or more criteria may be averaged to obtain threshold T. Optionally, a median of the scores of the NAMDDPs that meet the one more threshold setting criteria may be selected as the threshold T. Optionally, threshold T can be determined by comparing between the scores S1 and S2 of two consecutive NAMDDPs. Considering for instance that score S1 refers to an NAMDDP which arrived at t1 and score S2 refers to an NAMDDP which arrived at t2, wherein t2>t1, then threshold T may be set to equal S1 in the event that S1−S2>Diff, wherein Diff denotes a maximum score difference. For instance, assume a score S1 of an NAMDDP: S1=580 and a score S2 of a subsequent NAMDDP is S2=0.987 and Diff=10, then T=580. Optionally, T may be set equal to the highest score of a set of NAMDDPs until S1−S2>Diff.

In some embodiments, only a selection of NAMDDP may serve as a basis for determining threshold T. The selection of NAMDDP may be made based on values of parameters relating NAMDDP. Such parameters may comprise, for example, the number of batches, data size and/or the like of NAMDDPs, and/or the time period during which NAMDDPs are ingested.

Figure 4:
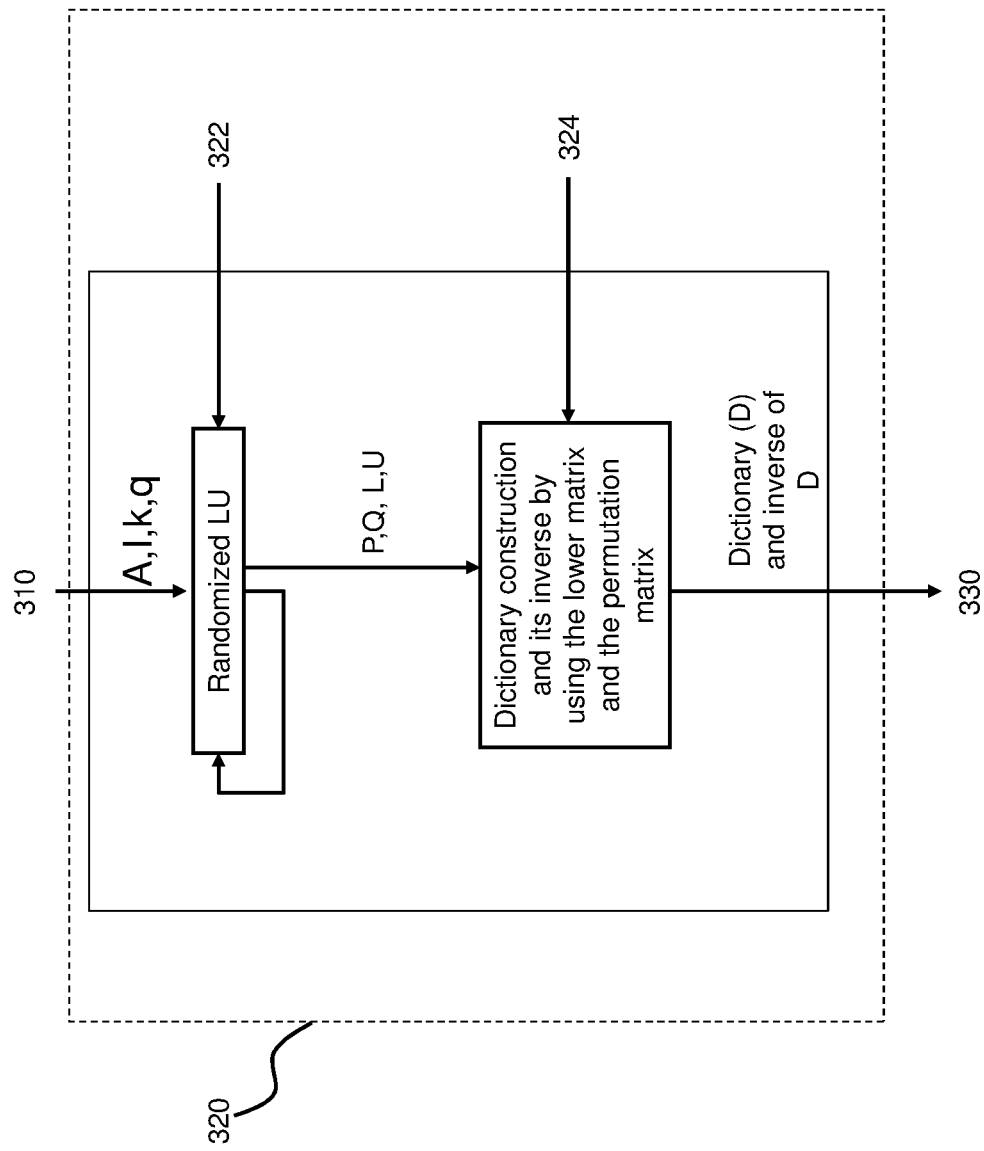
FIG. 4 shows a flow chart of a training step method, according to an embodiment.

Additional reference is made to FIG. 4.

The inputs to the training method are:

Matrix A of size m×n (m data points on n features) that represents the training data set, k is the rank of A, l is the number of random projections and q is the number of power iterations (can be zero).

In a training sequence relating to step 320, the following procedures may applied to matrix A in the online mode of operation.

Function "Randomized LU" is called (step 322).

The Input to function "Randomized LU": Matrix A of size m×n to decompose.

The Output of function "Randomized LU": Matrices P, L, U such that PA=LU where L and U are the lower and the upper triangular matrices, respectively, and P is an orthogonal permutation matrix given by P=Π$_{n-1}$ . . . Π$_1$ where Π$_k$ is an interchange permutation obtained by swapping rows k and piv(k) of I$_n$. The output of "Randomized LU" may be stored in memory 112.

More specifically, step 322 computes the factorization PA=LU where P is a permutation matrix encoded by piv(1:n−1), L is unit lower triangular with |l$_{ij}$|≤1 and U is upper triangular. For i=1, . . . , n, A(i,i:n) is overwritten by U(i,i:n) and A(i+1:n,i) is overwritten by L(i+1:n,i). The permutation P is given by P=Π$_{n-1}$ . . . Π$_1$ where Π$_k$ is an interchange permutation obtained by swapping rows k and piv(k) of I$_n$.

The following is an exemplary Pseudo-code implementation of step 322:

Function 2: Randomized LU Decomposition
Input:
  Matrix A of size m×n to decompose; k rank of A; l number of random projections where l>k; q number of power iterations (can be zero).
Output:
  Matrices P, Q, L, U such that ‖PAQ−LU‖$_2$≤O(σ$_{k+1}$), where P and Q are orthogonal permutation matrices, L and U are the lower and upper triangular matrices, respectively.
  1) Create a matrix G of size n×l whose entries are i.i.d. Gaussian random variables with zero mean and unit variance.
  2) Y←AG /* Random projection */
  3) for i=1 to q do
       Y←A(A$^T$Y) /* A$^T$ is the transpose of A */
  4) end for
  5) Apply "LU decomposition" (Function 1) to Y such that PY$_y$=L$_y$U$_y$
  6) Truncate L$_y$ and U$_y$ by choosing the first k columns and rows, respectively:
       L$_y$←L$_y$(:,1:k) and U$_y$←U$_y$(1:k,:)
  7) B←L$_y^\dagger$PA
  8) Apply "LU decomposition" (Function 1) to B with column pivoting BQ=L$_b$U$_b$
  9) L←L$_y$L$_b$
  10) U←U$_b$
    In a further step 324, the matrices D and D$^\dagger$ are constructed where D$^\dagger$ is the pseudo inverse of D. D is the constructed dictionary.

Figure 5:
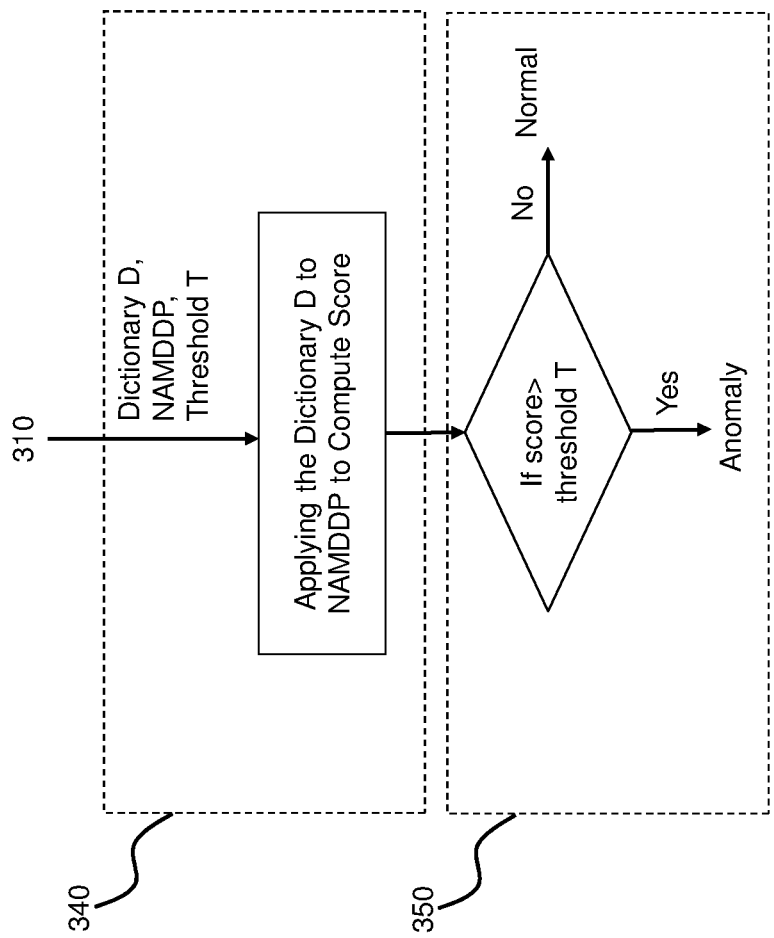
FIG. 5 shows a flow chart of a HDBD classifying method, according to an embodiment.

The following outlines an exemplary pseudo-code implementation of "Dictionary construction":

Function 3: Building a Low Dimensional Dictionary
Input:
  Matrix A of size m×n representing the training data set; k is the rank of A; l number of random projections where l>k; q number of power iterations (can be zero).
Output:
  Dictionary D and its pseudo-inverse D$^\dagger$ that represent the data such that ‖DD$^\dagger$A−A‖≤O(σ$_{k+1}$)
  1) [L, U, P, Q]←RandomizedLU(A,l,k,q) ("Randomized LU"—Function 2)
  2) D←P$^T$ L
  3) compute D$^\dagger$
  4) return D, D$^\dagger$ The dictionary is represented by two low rank matrices D and D$^\dagger$ which are applied to NAMDDPs, as outlined with respect to FIG. 5.

More specifically, once the dictionary D is constructed, it can be used to classify a NAMDDP. For instance, step 340 may comprise applying the dictionary D to NAMDDP to compute a score S. The classification step 350 may comprise classifying, by comparing the score S with threshold T to classify the NAMDDP as "normal", e.g., or "anomaly".

The following exemplifies a pseudo-code implementation of the "Classification" steps 340 and 350 for determining whether a newly arrived MDDP is anomalous or not.
Function 4: Classify Whether a NAMDDP is Anomalous
Input:
  Dictionary represented by D and D⁺, MDDP(x) to be classified that did not participate in the training phase, normalization function β(x) and threshold T.
Output:
  Returns the score S and a boolean B indicates if S>T. If B is TRUE it means that x is an anomalous MDDP. "Classification" may be applied for each newly arrived MDDP x. Alternative score normalizations may be applied than the one outlined herein below.

1) $S \leftarrow \frac{\|DD^\dagger x - x\|}{\beta(x)}$ 2) if S>T then
   a. B←TRUE
3) else
   a. B←FALSE
4) end if
5) return S, B Here, β(x) refers to a normalization factor which can be set in various ways like, e.g., $L^2$ norm of x. Other normalization options can take place. It can also be done without the normalization by β and then the threshold T will be different. If S>T in step 220 then x is anomalous, otherwise x is a normal MDDP.
  1. Step 2 (Y←AG) in "Randomized LU" can be parallelized since it contains matrix multiplication and its fits to be executed on Graphic Processing Unit (GPU).
  2. Randomized LU supports sparse representation.
  3. Online profile updating: The normal profile is determined by the choice of training data. But as time advances, the computed profile in past time may not represent well the current data behavior (drift in the current source data) and this can generate mis-detections and false positives. Properties 1 and 2 (parallelization and sparse representation) enable to run "Dictionary Construction" (Function 3) in the background all the time and thus achieves constant online updating of the profile, which represents normal behavior without worry about occurring changes in the profile.

Experimental Results

Figure 6:
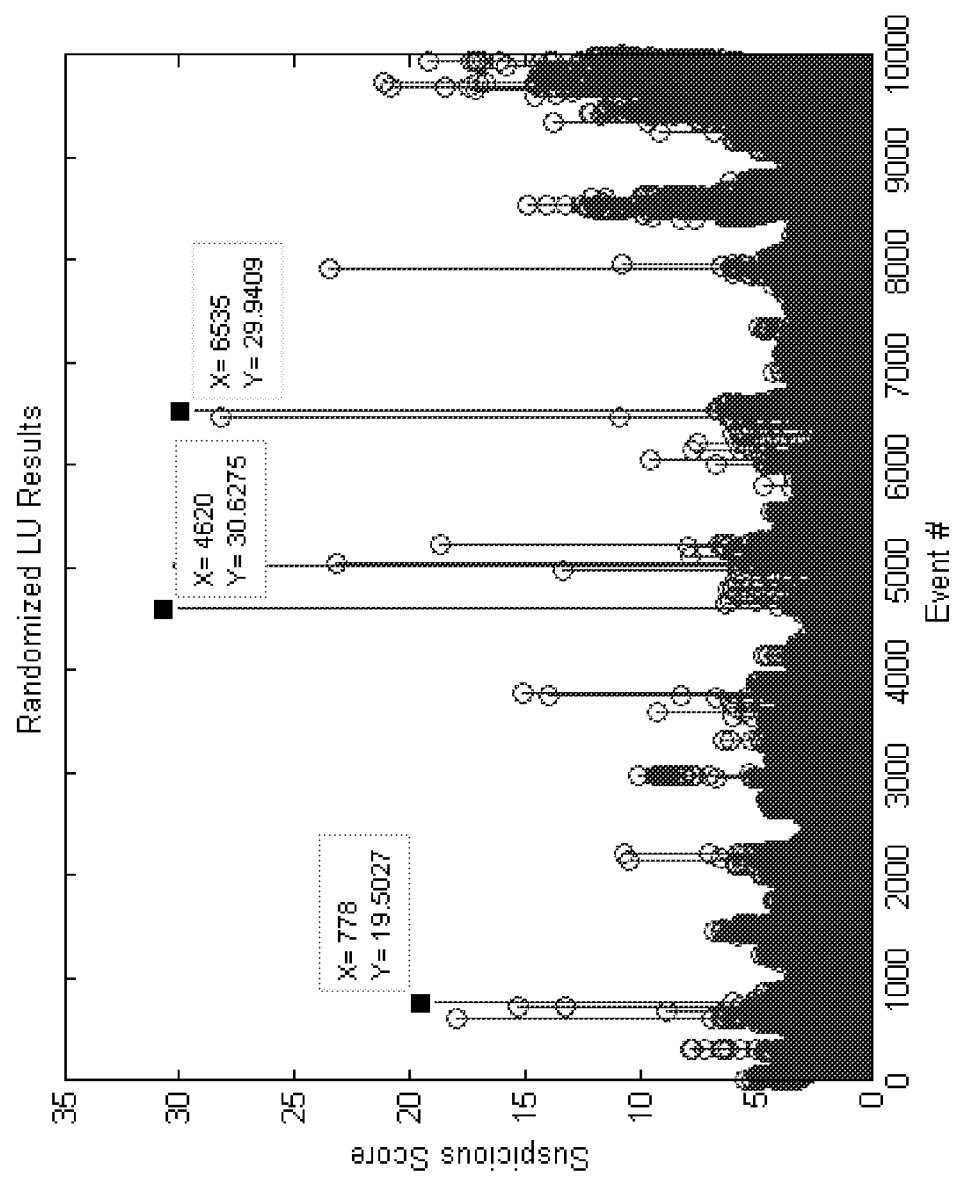
FIG. 6 is an example of anomaly detection in SCADA data.

Two different SCADA data sets (experiments 1 & 2) were processed by the application of "Classification". Each data set has two files: training and testing. Each data set is of dimension 330. It means that 330 parameters were extracted. Each file contains 9500 measurements. The data is labeled so we know where the anomalies are. The list of of anomalies from "Classification" corresponds to the list anomalies in the labeled data. The results are shown in FIG. 6.

Experiment I
The dimension n of the lower dimension space is n=184
Randomized LU decomposition results
Top 20 suspected anomalies

| Value of the anomaly | Location of the anomaly |
| --- | --- |
| 30.6275 | 4620 |
| 29.9409 | 6535 |
| 29.8043 | 5034 |
| 28.1574 | 6474 |
| 23.5014 | 7913 |
| 23.1802 | 5035 |
| 21.1395 | 9739 |
| 20.8486 | 9696 |
| 19.5027 | 778 |
| 19.1875 | 9934 |
| 18.6628 | 5220 |
| 18.422 | 9695 |
| 17.9109 | 603 |
| 17.4416 | 9700 |
| 17.4333 | 9701 |
| 17.3209 | 9935 |
| 17.1648 | 9673 |
| 17.1395 | 9938 |
| 17.0522 | 9936 |
| 17.0416 | 9738 |

Experiment II
The dimension n of the lower dimension space is n=184
Randomized LU decomposition results
Top 20 suspected anomalies

| Value of the anomaly | Location of the anomaly |
| --- | --- |
| 41.5115 | 9321 |
| 30.8942 | 2298 |
| 29.2055 | 8871 |
| 29.0372 | 363 |
| 28.5536 | 6552 |
| 28.2268 | 2233 |
| 26.7964 | 2232 |
| 25.6747 | 8870 |
| 25.0324 | 8877 |
| 23.1666 | 1500 |
| 23.0575 | 5112 |
| 22.1427 | 6612 |
| 21.7982 | 1386 |
| 21.6341 | 8872 |
| 20.7473 | 6551 |
| 20.5316 | 8869 |
| 19.6405 | 1460 |
| 19.6289 | 1501 |
| 18.5795 | 1483 |
| 18.0069 | 8873 |

Figure 7:
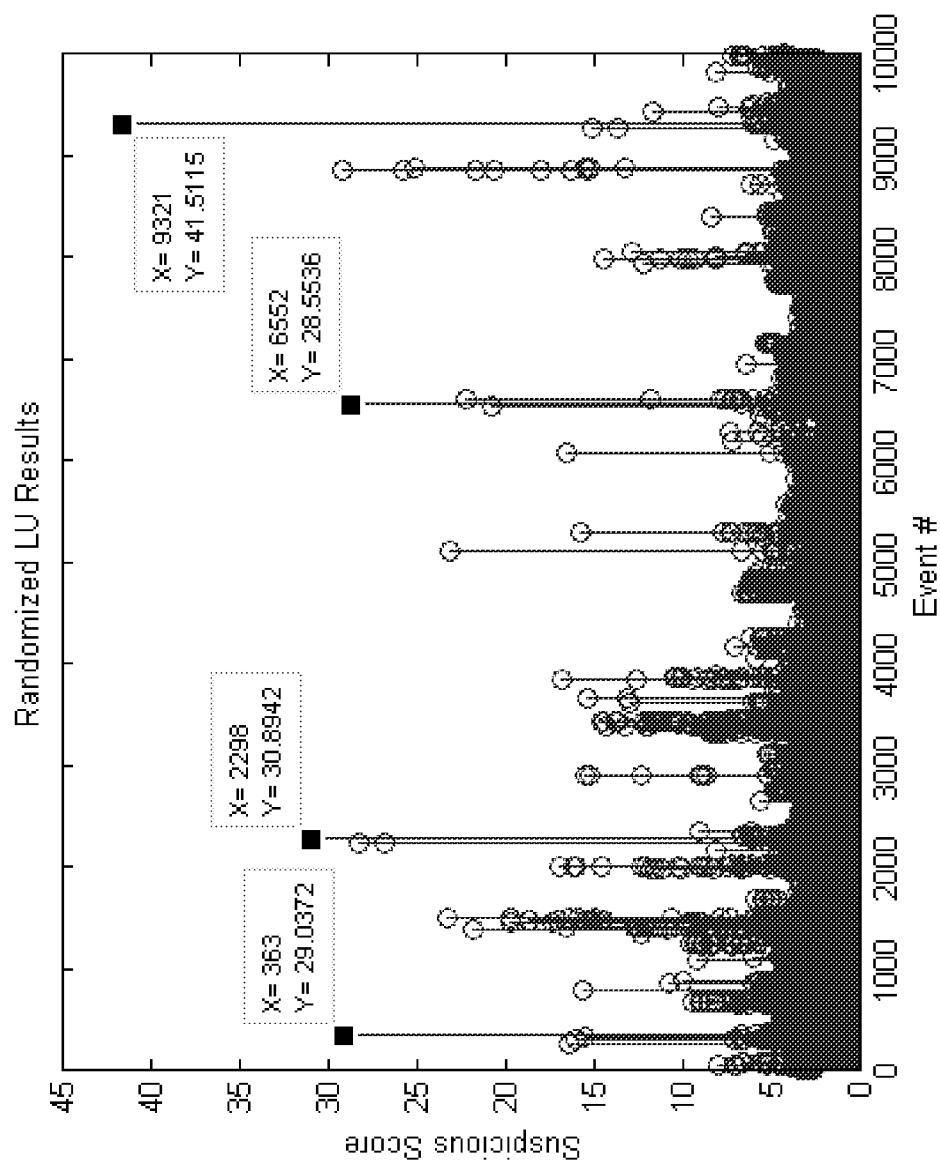
FIG. 7 is an example of anomaly detection in financial data.

Financial data set was processed by the application of "Classification". Each data set has two files: training and testing. Each data set is of dimension k=41. It means that 41 parameters were extracted. Each file contains 27000 measurements. The data is labeled so we know where the anomalies occur. The list of anomalies from "Classification" corresponds to the list anomalies in the labeled data. The results are shown in FIG. 7
Top 20 Anomaly suspected, Score vs Index:
Randomized LU decomposition results:

| Value of the anomaly | Location of the anomaly |
| --- | --- |
| 2.02938 | 4690 |
| 1.87309 | 19218 |
| 1.78573 | 13419 |
| 1.64452 | 3624 |
| 1.56948 | 4586 |
| 1.46673 | 26215 |

-continued

| Value of the anomaly | Location of the anomaly |
|---|---|
| 1.30143 | 1341 |
| 1.20325 | 6075 |
| 1.1843 | 25527 |
| 1.14866 | 2224 |
| 1.12093 | 15906 |
| 1.10397 | 4794 |
| 1.0943 | 12452 |
| 1.04028 | 8028 |
| 1.02571 | 813 |
| 1.0226 | 7326 |
| 1.02258 | 26557 |
| 1.00978 | 7965 |
| 1.00607 | 12935 |
| 1.00293 | 19485 |

Some of the anomalies are marked in FIG. 7

The various features and steps discussed above, as well as other known equivalents for each such feature or step, can be mixed and matched by one of ordinary skill in this art to perform methods in accordance with principles described herein. Although the disclosure has been provided in the context of certain embodiments and examples, it will be understood by those skilled in the art that the disclosure extends beyond the specifically described embodiments to other alternative embodiments and/or uses and obvious modifications and equivalents thereof. Accordingly, the disclosure is not intended to be limited by the specific disclosures of embodiments herein.

For example, any digital computer system can be configured or otherwise programmed to implement a method disclosed herein, and to the extent that a particular digital computer system is configured to implement such a method, it is within the scope and spirit of the disclosure. Once a digital computer system is programmed to perform particular functions pursuant to computer-executable instructions from program software that implements a method disclosed herein, it in effect becomes a special purpose computer particular to an embodiment of the method disclosed herein. The techniques necessary to achieve this are well known to those skilled in the art and thus are not further described herein. The methods and/or processes disclosed herein may be implemented as a computer program product such as, for example, a computer program tangibly embodied in an information carrier, for example, in a non-transitory computer-readable or non-transitory machine-readable storage device and/or in a propagated signal, for execution by or to control the operation of, a data processing apparatus including, for example, one or more programmable processors and/or one or more computers. The terms "non-transitory computer-readable storage device" and "non-transitory machine-readable storage device". The term "non-transitory" is used to exclude transitory, propagating signals, but to otherwise include any volatile or non-volatile computer memory technology suitable to the application including, for example, distribution media, intermediate storage media, execution memory of a computer, and any other medium or device capable of storing for later reading by a computer program implementing embodiments of a method disclosed herein. A computer program product can be deployed to be executed on one computer or on multiple computers at one site or distributed across multiple sites and interconnected by a communication network.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

Unless otherwise stated, the use of the expression "and/or" between the last two members of a list of options for selection indicates that a selection of one or more of the listed options is appropriate and may be made.

It should be understood that where the claims or specification refer to "a" or "an" element, such reference is not to be construed as there being only one of that element.

It is appreciated that certain features of the invention, which are, for clarity, described in the context of separate embodiments or example, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

What is claimed is:

1. In a computer system, a method comprising:
   a) receiving training data in the form of a m×n matrix A with rank k, wherein matrix A comprises a plurality of m multidimensional data points (MDDPs) with a dimension n≥3;
   b) based on the training data, constructing a dictionary D by applying randomized lower and upper triangular matrix (LU) decomposition to matrix A, wherein dictionary D is of size m×k or n×k and wherein k<n and k<<m;
   c) determining a score S for a newly arrived multidimensional data point (NAMDDP) x based on the constructed dictionary D and its pseudo-inverse $D^\dagger$ using data of size m×k or n×k instead of m×n, wherein score S is in the form $$S \leftarrow \frac{\|DD^\dagger x - x\|}{\beta(x)}$$

and wherein β(x) is a normalization function; and d) classifying x as a normal MDDP or as an anomaly by comparing its score S with a threshold T, wherein classification of x as an anomaly is indicative of detection of an unknown undesirable event, wherein the determining a score S by processing dictionary D of size m×k or n×k instead of matrix A of size m×n causes the determining of score S to be faster and to require less computational effort, thereby enhancing anomaly detection performance, and wherein the constructing a dictionary D, determining a score S and classifying x as a normal MDDP or as an anomaly is done by an anomaly detection engine of the computer system that is configurable on-the-fly without changing software code and without even halting operation of the computer system to optimize work flow, throughput and performance of the computer system for anomaly detection.

2. The method of claim 1, wherein the threshold T is determined based on a percentage of NAMDPPs with the largest score S.

3. The method of claim 1, wherein the threshold T is determined based on of NAMDPPs that have a score S above a certain limit.

4. The method of claim 1, wherein the threshold T is determined by comparing between scores S1 and S2 of two consecutive NAMDDPs.

5. The method of claim 1, wherein the unknown undesirable event is selected form the group consisting of a financial risk event, a financial threat event, a financial fraud event and a financial network intrusion event.

6. The method of claim 1, wherein the unknown undesirable event includes money laundering.

7. The method of claim 1, wherein the unknown undesirable event is an undesirable event that is unknown before application of the method to perform steps (a)-d) to detect and classify the anomaly indicative of the detection of the unknown undesirable event.

8. The method of claim 1, wherein the classifying is performed automatically and unsupervised without relying on a signature.

9. The method of claim 1, wherein the classifying is performed automatically and unsupervised without relying on a rule.

10. The method of claim 1, wherein the classifying is performed automatically and unsupervised without relying on domain expertise.

11. A non-transitory computer readable storage medium storing a set of instructions that are executable by at least one processor of a server in a computer system to perform a method for detecting an anomaly, the method comprising:
a) receiving training data in the form of a m×n matrix A with rank k, wherein matrix A comprises a plurality of m multidimensional data points (MDDPs) with a dimension n≥3;
b) based on the training data, constructing a dictionary D by applying randomized lower and upper triangular matrix (LU) decomposition to matrix A, wherein dictionary D is of size m×k or n×k and wherein k<n and k<<m;
c) determining a score S for a newly arrived multidimensional data point (NAMDDP) x based on the constructed dictionary D and its pseudo-inverse $D^\dagger$ using data of size m×k or n×k instead of m×n, wherein score S is in the form $$S \leftarrow \frac{\|DD^\dagger x - x\|}{\beta(x)}$$

and wherein β(x) is a normalization function; and
d) classifying x as a normal MDDP or as an anomaly by comparing its score S with a threshold T, wherein classification of x as an anomaly is indicative of detection of an unknown undesirable event, wherein the determining a score S by processing dictionary D of size m×k or n×k instead of matrix A of size m×n causes the determining of score S to be faster and to require less computational effort, thereby enhancing anomaly detection performance, and wherein the constructing a dictionary D, determining a score S and classifying x as a normal MDDP or as an anomaly is done by an anomaly detection engine of the computer system that is configurable on-the-fly without changing software code and without even halting operation of the computer system to optimize work flow, throughput and performance of the computer system for anomaly detection.

12. The non-transitory computer readable storage medium of claim 11, wherein the threshold T is determined based on a percentage of NAMDPPs with the largest score S.

13. The non-transitory computer readable storage medium of claim 11, wherein the threshold T is determined based on of NAMDPPs that have a score S above a certain limit.

14. The non-transitory computer readable storage medium of claim 11, wherein the threshold T is determined by comparing between scores S1 and S2 of two consecutive NAMDDPs.

15. The non-transitory computer readable storage medium of claim 11, wherein the unknown undesirable event is selected form the group consisting of a financial risk event, a financial threat event, a financial fraud event and a financial network intrusion event.

16. The non-transitory computer readable storage medium of claim 11, wherein the unknown undesirable event includes money laundering.

17. The non-transitory computer readable storage medium of claim 11, wherein the unknown undesirable event is an undesirable event that is unknown before application of the method to perform steps (a)-d) to detect and classify the anomaly indicative of the detection of the unknown undesirable event.

18. The non-transitory computer readable storage medium of claim 11, wherein the classifying is performed automatically and unsupervised without relying on a signature.

19. The non-transitory computer readable storage medium of claim 11, wherein the classifying is performed automatically and unsupervised without relying on a rule.

20. The non-transitory computer readable storage medium of claim 11, wherein the classifying is performed automatically and unsupervised without relying on domain expertise.

* * * * *